United States Patent [19]

Allen et al.

[11]  4,098,744
[45]  Jul. 4, 1978

[54] CURABLE WATER-BORNE EPOXY RESIN COATING COMPOSITIONS

[75] Inventors: Roy A. Allen; LeRoy W. Scott, both of Houston, Tex.

[73] Assignee: Shell Oil Company, Houston, Tex.

[21] Appl. No.: 782,206

[22] Filed: Mar. 28, 1977

[51] Int. Cl.$^2$ .................. C08L 61/06; C08L 63/00
[52] U.S. Cl. .................. 260/29.3; 260/29.4 R; 260/831; 260/834
[58] Field of Search ............ 260/831, 834, 29.3, 260/29.4 R

[56] References Cited

U.S. PATENT DOCUMENTS 3,215,586  11/1965  Lister ........................ 260/42.28

FOREIGN PATENT DOCUMENTS

| 1,934,715 | 1/1971 | Fed. Rep. of Germany. |
| 2,153,616 | 5/1973 | Fed. Rep. of Germany. |
| 1,017,699 | 1/1966 | United Kingdom. |
| 1,141,206 | 1/1969 | United Kingdom. |

*Primary Examiner*—Paul Lieberman
*Attorney, Agent, or Firm*—Norris E. Faringer

[57]  ABSTRACT

Hydrolytically-stable, water-soluble curable coating compositions are prepared by (1) condensing an epoxy resin with an amino-substituted aromatic carboxylic acid, preferably an amino-substituted benzoic acid, and then (2) essentially neutralizing the condensate with an amine, preferably a tertiary amine such as triethylamine and dimethylethanol amine or ammonia.

12 Claims, No Drawings

CURABLE WATER-BORNE EPOXY RESIN COATING COMPOSITIONS

BACKGROUND OF THE INVENTION

Current EPA-compliant water-borne coatings such as those in which the volatile component contains less than 20% organic solvent are very much in demand, especially for metal decorating and can lining applications.

Although excellent performance has been obtained for many years from systems based on organic solvent-borne, solid, epoxy resin type compositions cured with aminoplast or phenolic resins, these coating systems contain about 60-70% organic solvent, and therefore cannot comply with existing air pollution regulations without recourse to costly incineration of the solvent driven off during the baking step.

Currently, two approaches have been taken to develop a water-borne epoxy resin baking system for use in baked coatings such as can linings: (1) the so-called "high acid number" epoxy resin ester vehicle and (2) emulsions of solid epoxy resins. Both types of compositions are blended with a suitable curing agent, such as the amino resins, to achieve crosslinking during a typical bake schedule of 10 minutes at 400° F. The epoxy ester approach produces good roller coating application properties, i.e. good rheology; however, this ester coating falls short in resistance to food products, and the storage stability of these epoxy types is only fair. On the other hand, the solid epoxy resin emulsion systems give good cured film properties, but have poor application properties on high speed roller coaters.

It would be very desirable to combine the best properties of each system into a single system.

A water-borne system which combines these advantages into a single system is described in copending patent application Ser. No. 782,208, filed Mar. 28, 1977. Although this water-borne system does offer significant improvement over the epoxy resin ester systems and solid resin emulsion systems, these systems have certain shortcomings. Specifically, the compositions described in Ser. No. 782,208 require the use of low molecular weight epoxy resins, i.e. normally liquid resins. Also, the preparation of these compositions require a three-step process.

It has now been found that water-borne baking systems having improved physical properties can be made with solid as well as liquid epoxy resins in a simpler two-step process.

SUMMARY OF THE INVENTION

The present invention provides an improved epoxy resin system which combines the good application properties of the water soluble epoxy ester type with the excellent film properties of the emulsion type into a single system.

It is believed that the poor hydrolytic stability of the solubilized epoxy resin ester vehicles results from the fact that such resins are solubilized by means of pendant carboxyl groups attached to the resin molecule through ester linkages. These ester linkages are quite vulnerable to hydrolytic attack, particularly due to the basicity of the system caused by the solubilizing amine. Thus, on storage, the carboxyl groups are split from the resin via ester cleavage, resulting in a gradual decrease in miscibility leading ultimately to phase separation.

The instant invention, therefore, provides a simplified method for preparing a water-borne epoxy resin wherein an epoxy resin, preferably a solid epoxy resin is first reacted with an approximately stoichiometric amount of an amino-substituted benzoic acid to produce an essentially epoxy-free, carboxyl-containing adduct, and then solubilizing this adduct with an amine, preferably a tertiary amine or ammonia. When a water-soluble or water-miscible resin such as the aminoplast or phenolic resins is added to these water-borne epoxy compositions, excellent baking enamels are produced which are especially suitable for coatings such as can coatings.

DESCRIPTION OF THE PREFERRED EMBODIMENT

The preparation of the instant hydrolytically stable, water-soluble epoxy coating composition, which when cured with suitable curing agents, such as amino resins and the like, produce excellent surface coatings, comprises a two-step method.

In the first step, an amino-substituted benzoic acid, such as para-aminobenzoic or anthranilic acid (ortho-aminobenzoic acid) is reacted with a low molecular weight epoxy resin at temperatures low enough to react the amine groups with the epoxy resin in an organic solvent, preferably an ether-alcohol solution (i.e., about a 25% by weight of the total reactants) while leaving the carboxyl group essentially unreacted.

In the second step, the reaction product is "neutralized" by reacting the pendant carboxyl groups with an amine, preferably a tertiary amine, such as triethylamine, dimethylethanolamine and 2-dimethylamino-2-methyl-1-propanol or ammonia.

This water-miscible resin is stable and curable. To produce a water-borne system, a suitable water-soluble or water-miscible crosslinking agent such as the amino-containing resins, including the urea-formaldehyde and melamine-formaldehyde resins, as, for example, hexamethoxy methyl melamine resin, is added with sufficient water to yield a stable aqueous baking system, especially suitable for metal decorating and package lining applications such as can linings.

EPOXY COMPOUNDS

The epoxy compounds which may be used to prepare the instant adducts at least one 1,2-epoxide group, i.e., a

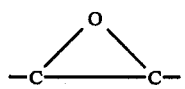

group. They may be monoepoxides or polyepoxides. The monoepoxides may be aliphatic or cycloaliphatic or heterocyclic and may be saturated or unsaturated. They may also be substituted with aromatic rings, ether groups, halogen atoms, ester groups, and the like. Examples of the monoepoxides include, among others, styrene oxide, phenyl glycidyl ether, allyl glycidyl ether, octadecyl glycidyl ether, amyl glycidyl ether, chlorophenyl glycidyl ether, naphthyl glycidyl ether, 1,2-hexylene oxide, ethylene oxide, propylene oxide, 1-heptylene oxide, 3-ethyl-1,2-pentylene oxide, glycidyl acetate, glycidyl benzoate, glycidyl propionate, glycidyl acrylate, glycidyl allyl phthalate, glycidyl methyl maleate, glycidyl stearate, glycidyl oleate, methyl 1,2- epoxy propionate, butyl 1,2-epoxy propionate, and the like.

The polyepoxides used in the process of the invention comprise those compounds processing more than one 1,2-epoxide group. These polyepoxides may be saturated or unsaturated, aliphatic, cycloaliphatic, aromatic or heterocyclic and may be substituted if desired with noninterfering substituents, such as halogen atoms, phosphorus atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 3,633,458. The polyepoxides used in the present process are those having an epoxy equivalency greater than 1.0.

Various examples of polyepoxides that may be used in the invention are given in U.S. Pat. No. 2,633,458 and it is to be understood that so much of the disclosure of that patent relative to examples of polyepoxides is incorporated by reference into this specification.

Other suitable mono and polyepoxides, including ethers and esters are disclosed in U.S. Pat. No. 3,738,862, and so much of the disclosure of that patent relevant to examples of epoxy compounds is incorporated by reference into this specification.

Other suitable polyepoxides are disclosed in U.S. Pat. Nos. 3,356,624, 3,408,219, 3,446,762 and 3,446,762, and so much of the disclosure relevant to examples of epoxy compounds is incorporated by reference into this specification.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as BF$_3$, followed by dehydrohalogenation in the presence of caustic. When the phenol is Bisphenol A, the resulting saturated epoxy compound is sometimes referred to as "diepoxidized hydrogenated bisphenol A", or more properly as the diglycidyl ether of 2,2-bis(4-cyclohexanol) propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

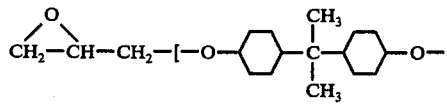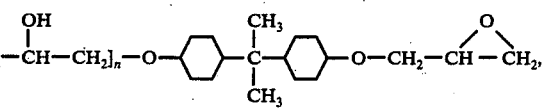

wherein $n$ has a value so that the average molecular weight of the saturated polyepoxide is from about 350 to about 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

The most preferred epoxy resin for use in the present compositions is a glycidyl polyether of 2,2-bis(4-hydroxyphenyl)propane having a molecular weight between about 350 and 3000. A very suitable liquid glycidyl polyether is designated as polyether A in U.S. Pat. No. 2,633,458. Very suitable solid epoxy resins include the glycidyl polyethers of BPA marketed under the trade designations of EPON® Resin 1001, 1004, 1007, etc. Other suitable solid epoxy resins include the condensates or fusion resins prepared as described in U.S. Pat. No. 3,477,990. Under certain conditions, a portion of the epoxy resin can be glycidylized novolak.

Suitable amino-substituted aromatic carboxylic acids include the acids having the following structure:

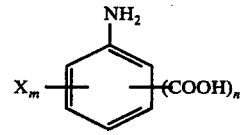

wherein X is selected from the group consisting of hydroxyl, alkyl and halogen radicals, $n$ has a value of 1 or 2 and $m$ has the value of 0 or 1.

Preferred amino-substituted aromatic carboxylic acids include the amino-substituted benzoic acids such as the ortho-, mata- and para-aminobenzoic acid.

The most preferred aromatic acid is para-aminobenzoic acid (PABA).

The use of "para-aminobenzoic acid" or "PABA" in the present disclosure relevant to the preparation of the instant precondensates and coating compositions is deemed to include the other amino-substituted aromatic acids as such terms are used for convenience only.

The precondensates prepared by reacting these amino-substituted aromatic carboxylic acids with epoxy compounds are disclosed and claimed in copending patent application Ser. No. 782,207 filed Mar. 28, 1977, and so much of disclosure thereof relevant to the preparation of the instant precondensates is incorporated herein by reference.

The para-aminobenzoic acid is condensed with the glycidyl polyether under conditions which cause the amine group to react with the epoxy and hydroxy groups of the polyether, while leaving the carboxyl group essentially unreacted. In general, a low temperature is employed such as about between 150° and 250° F. In general, the reactants are combined in near stoichiometric amounts; however, an excess of either reactant, say up to 10% excess, may be employed with a slight excess of amine hydrogen over epoxide groups being preferred. Expressed another way, the amounts of epoxy resin and amino-benzoic acid employed will usually be in amounts to produce a condensate having a theoretical acid number between about 30 to 90, preferably between about 40 and 60, and a weight per epoxy (WPE) of from about 2400 to about 40,000, and preferably from about 10,000 to about 40,000. These high WPE's are due to the slight excess of amine hydrogen.

In the second step, the carboxyl-containing epoxy-aminobenzoic acid adduct is reacted with an amine, preferably a tertiary amine, wherein the carboxyl groups are "neutralized" and the adduct solubilized.

Suitable primary amines include the amines of the general formula:

$$RNH_2$$

wherein R may be an alkyl radical: methyl, propyl, butyl, and the like; or an alkanol radical: methanol, ethanol, propanol and the like. A preferred primary amine is 2-amino-2-methyl-1-propanol.

Suitable secondary amines include the amines of the general formula:

$$HN\begin{matrix}R_1\\R_2\end{matrix}$$

wherein $R_1$ and $R_2$ may be the same or different hydrocarbon radicals; such as alkyl radicals: methyl, propyl, butyl, and the like; alkanol radicals: methanol, ethanol, propanol and the like.

Examples of very suitable secondary amines include N-methylethanol amine, diethanolamine, dimethylamine, diethylamine, dipropylamine, and morpholine.

Suitable tertiary amines include the amines of the general formula:

$$\begin{matrix}R_1\\|\\N-R_2\\|\\R_3\end{matrix}$$

wherein $R_1$, $R_2$ and $R_3$ may be the same or different hydrocarbon radicals; such as alkyl radicals: methyl, propyl, isopropyl, butyl, etc.; alkanol radicals: methanol, ethanol, propanol, isopropanol, and the like.

Examples of very suitable tertiary amines include triethylamine, triisopropylamine, tributylamine, dimethylethanolamine and diethylethanolamine. A preferred tertiary amine is 2-dimethylamino-2-methyl-1-propanol.

Preferred are the tertiary amines and ammonia.

The second step (neutralization) reaction is generally performed at temperatures between about 150° and 210° F, and preferably between about 180° and 190° F.

The neutralized product from step two may be conveniently converted to an aqueous baking system by adding sufficient water to produce a system of 20–30% non-volatiles and then adding a water-soluble or water-miscible curing agent such as the aminoplast resins and phenolic resins.

A preferred method of preparing an aqueous baking system is to add the aminoplast or phenolic resins to the neutralized amino-benzoic acid resin solution before adding water. This makes it possible to employ crosslinking resins that are less water soluble.

Suitable organic solvents include the ether alcohols, such as the methyl, ethyl or butyl ethers of ethylene glycol or propylene glycol as well as methyl OXITOL ® glycol ether and methyl CELLOSOLVE ® esters such as CELLOSOLVE ® acetate (ethylene glycol monoacetate) and methyl CELLOSOLVE ® acetate (acetate of ethylene glycol monoethyl ether); propylene glycol ethers like PROPASOL B; and water-miscible ketones such as methyl ethyl ketone (MEK), methyl isobutyl ketone (MIBK) and cyclohexanone.

Suitable water-soluble cross-linking agents include the so-called amino resins or amino-plasts containing —$NH_2$ groups derived from urea and melamine. Suitable amino-containing resins are prepared by reacting urea or melamine with formaldehyde under well-known conditions to form a reaction monomer first and then, by condensation polymerization, a large number of varying types of polymeric intermediates are formed. The preparation of urea-formaldehyde and melamine-formaldehyde resins is well-known in the art and forms no part of the present invention. Their use in crosslinking epoxy resins mostly through methylol groups is also well-known. Accordingly, a large number of aminoplast and phenol-plast resins, i.e., urea-formaldehyde and melamine-formaldehyde resins, are commercially available under such trade designations as Plaskon, Beetle, Cymel, Fiberite, Resimene, Curacron and Beckamine, among many others. A very suitable water-soluble cross-linking agent include the hexamethoxy methylmelamines marketed under the trade designation of CYMEL ®.

The aqueous system which contains from about 20% to 30% nonvolatiles, with from about 70% to 90% of the total solvent being water, the remainder being organic solvents, may be applied to the substrate by any suitable means such as by brush, blade or spraying. The resulting coating is then cured by heating for 2 to 10 minutes at 350° to 400° F.

Of course, other conventional additives may be employed such as catalysts, thixotropic agents, plasticizers, pigments, fillers, etc.

Any catalyst may be employed which is known to catalyze the crosslinking reaction with aminoplast and phenolic resins may be employed if desired. Very suitable catalysts include the so-called acidic catalysts such as sulfuric acid, phosphoric acid, p-toluene-sulfonic acid and citric acid.

In order to illustrate the invention more fully, a number of specific embodiments are given. The reactants, their proportions and other specific ingredients are presented as being typical and various modifications can be made in view of the foregoing disclosure and discussion without departing from the spirit or scope of the specification or of the claims. Unless otherwise stated, parts and percentages are by weight.

EXAMPLE I

Preparation of Precondensate Resin Solution "A"

Into a four-necked, 2-liter flask equipped with stirrer, nitrogen blanket, thermometer, condenser and heating mantle was charged 652.8 parts by weight of a solid epoxy resin (a glycidyl polyether of 2,2-bis(4-hydroxyphenol)propane, with a molecular weight of about 1000), together with 166.7 parts by weight of the monoethyl ether of ethylene glycol and 83.3 parts of ethyl alcohol. The temperature is raised to 80° C until resin is dissolved. Para-aminobenzoic acid, 97.2 parts by weight are then added. The temperature is maintained at 80° C for 12 to 15 hours to complete the preparation. The final product has an acid value of 50.5 and a viscosity of 7.5 poise when reduced to 50% NV with additional monoethyl ether of ethylene glycol. The weight per epoxide of the resin is about 2000.

A clear baking finish, suitable for beverage can linings was prepared from the formulation shown below:

| | |
|---|---|
| Precondensate Resin Solution "A" | 150 |
| Ethyl alcohol | 18 |
| Hexamethoxymethylmelamine (CYMEL ® 301) (HMM) | 28 |
| 2-dimethylamino-2-methyl-1-propanol (85% of theoretical amount required to neutralize) | 13 |
| Demineralized water | 260 |

PROCEDURE:

1. Precondensate Resin Solution "A", ethylalcohol, and hexamethoxymethylmelamine were heated to 150° F and thoroughly mixed.
2. The 2-dimethylamino-2-methyl-1-propanol (DMAMP 80) was stirred in thoroughly.
3. Demineralized water is then incorporated in 30-gram increments with thorough agitation.

| Solution Properties: | |
|---|---|
| % Solids | 30.2 |
| Viscosity (Gardner-Holdt) | "F" |
| Ratio of HMM to precondensate resin | 20/80 |

FILM PROPERTIES

The film properties of the p-aminobenzoic acid precondensate are shown below, compared to a typical water-borne epoxy ester control system. Films, 0.20 to 0.25 mil dry thickness were applied via wire wound draw down bar to electrolytic tin plate and baked 10 minutes at 400° F (204° C).

| | Precondensate Resin Coating | Control System* |
|---|---|---|
| Methyl Ethyl Ketone double rubs | >100 | 40–50 |
| Flex, mm (wedge-blend) | 39 | 43 |
| Steam Processing 90 mm at 250° F Blush Resistance | Excellent | Excellent |
| Tape Adhesion | Pass | Pass |

*Water-soluble epoxy resin ester type, crosslinked with hexamethoxy methylmelamine.

| Package Stability: | | |
|---|---|---|
| Storage days at 120° F (48.9° C) | p-Aminobenzoic Precondensate System Gardner-Holdt Viscosity | Control System Gardner-Holdt Viscosity |
| Initial | E-F | B |
| 3 | D-E | A-1* |
| 11 | D-E | B |
| 14 | D-E | B |
| 17 | D-E | K** |
| 21 | E | CEL |

*Slightly cloudy
**Increased cloudiness

Several typical solubilizing amines were evaluated for effectiveness with the precondensate resin from Example I. The amines were judged on the basis of initial solubility and maintenance of clarity after 7 days storage at 120° F. The stoichiometric quantity of the amines used was also varied. "Initial Solubility" and "Clarity After Storage at 120° F" is measured on a 0 to 10 scale with ten being the best.

| Amine | % Stoichiometry | Initial Solubility | Clarity After Storage at 120° F |
|---|---|---|---|
| 2-dimethylamino-2-methyl-1-propanol | 100 | 10 | 10 |
| | 85 | 10 | 9 |
| 2-amino-2-methyl-1-propanol | 100 | 10 | 9 |
| | 85 | 10 | 9 |
| Dimethyl ethanolamine | 100 | 10 | 9 |
| | 85 | 9 | 5 |
| Triethylamine | 100 | 9 | 5 |
| | 85 | 8 | 0 |
| Ammonia | 100 | 8 | 4 |
| | 85 | 0 | 0 |

EXAMPLE II

Preparation of Precondensate Resin Solution "B"

Method same as used for Solution "A". In this composition, however, the solid epoxy resin of 1000 molecular weight was replaced with an equal weight of a resin of about 1400 molecular weight. This precondensate resin had a final acid number of 53 and was higher in viscosity, 15 poises (reduced to 50% non-volatile with additional monoethyl ether of ethylene glycol) as compared with 7.5 poises for preparation "A". Coating properties of this resin were similar to "A".

EXAMPLE III

Preparation of Precondensate Resin Solution "C"

Method same as used for Solution "A". In this formulation, (shown below) the p-aminobenzoic acid was replaced with o-aminobenzoic acid (anthranilic acid).

| | |
|---|---|
| Anthranilic acid | 9.72 |
| Solid Epoxy Resin MW ~1400 | 65.28 |
| Monoethyl ether of ethylene glycol | 16.67 |
| Ethyl alcohol | 8.33 |
| | 100.00 |

The anthranilic acid precondensate (viscosity 15 possess at 50% NV in glycol ether acid value 51) was not as easily solubilized in water as the para-aminobenzoic acid precondensate, requiring higher levels of solubilizing amine (100–125% of theory) to achieve solubility. In a coating composition containing 20% HMM crosslinking agent, the curing and film properties were not as good as the system containing para-aminobenzoic acid.

EXAMPLE IV

Preparation of Precondensate Resin Solution "D"

A four-necked, three liter flask equipped with stirrer, nitrogen blanket, thermometer, condenser and heating mantle was charged with 351 grams of a solid epoxy resin (a glycidyl polyether of 2,2-bis(4-hydroxyphenyl)-propane, with a weight per epoxide (WPE) of 495) together with 940 grams of a solid epoxy resin, with a WPE of 690. Ethylene glycol monobutyl ether, 360 grams was also added, and the temperature raised to 105° C for one hour to dissolve the resins. The temperature is lowered to 85° C and 149 grams PABA added. The temperature is raised over a 60 minute period to 116° C and held at 116°–121° C for 5 hours. At 5 hours the resin had a 39.9 acid value, and a viscosity of 25 poises, cut to 50% non-volatiles with ethylene glycol monoethyl ether. The batch of resin was neutralized by adding 149 grams of 2-dimethylamino-2-methyl-1-propanol, and stirred at 116° C for 40 minutes to complete the preparation.

A clear baking finish, suitable for beverage can linings was prepared from the following formulation:

| Formulation | Parts by Wt. |
| --- | --- |
| Precondensate Resin Solution "D" | 150 |
| Cymel 370 (Water-soluble Melamine Resin 88% NV in isopropanol) | 22 |
| Demineralized Water | 277 |

PROCEDURE

1. Precondensate Resin Solution "D" was heated at 116° C.
2. Cymel 370 was stirred in thoroughly.
3. Demineralized water is then incorporated in 30-gram increments with thorough agitation.

| Solution Properties | |
| --- | --- |
| % Solids | 29.0 |
| Viscosity (Gardner Holdt) | "E-F" |
| Ratio of melamine resin to precondensate resin | 15/85 |

FILM PROPERTIES

A 0.2 mil film was applied to a commercially treated aluminum can body and baked 2 minutes at 204° C. The film properties were as follows:

| Methyl Ethyl Ketone double rubs | >100 |
| --- | --- |
| Flex ("T" bend) | pass 1 T |

| Beer Pasteurization (30 minutes at 150° F) | |
| --- | --- |
| Blush | pass |
| Adhesion | pass |

PACKAGE STABILITY

After 30 days at 120° F, the system was essentially unchanged except for a slight drop in viscosity, from "E-F" to "D-E".

What is claimed is:

1. A hydrolytically-stable, heat-curable composition comprising:
   (1) a water-soluble composition prepared by (a) condensing near chemical equivalent amounts of an epoxy resin having more than one 1,2-epoxy group with an amino-containing aromatic carboxylic acid, and (b) solubilizing the resulting condensate by reacting the pendant carboxyl groups with an amine or ammonia, and
   (2) a curing amount of a water-miscible aminoplast or phenoplast resin.

2. The composition of claim 1 wherein the amino-containing aromatic acid is an amino-substituted benzoic acid.

3. The composition of claim 2 wherein the amino-substituted benzoic acid is para-aminobenzoic acid.

4. The composition of claim 1 wherein the epoxy resin is a glycidyl polyether of 2,2-bis(4-hydroxyphenyl)propane having a molecular weight between about 350 and 3000.

5. The composition of claim 1 wherein the condensate of step (a) has an acid number between about 30 and 90.

6. The composition of claim 1 wherein the amine is a tertiary amine.

7. The composition of claim 6 wherein the tertiary amine is 2-dimethylamino-2-methyl-1-propanol.

8. The composition of claim 1 wherein the amine is 2-amino-2-methyl-1-propanol.

9. The composition of claim 6 wherein the tertiary amine is dimethylethanolamine.

10. The composition of claim 1 wherein the curing agent is a hexamethoxy methylmelamine resin.

11. The composition of claim 1 comprising from about 20 to about 30% nonvolatiles in a solvent.

12. The composition of claim 11 wherein the solvent consists of from 70% to 90% by volume of water and from 10% to 30% by volume of organic solvent.

* * * * *

Notice of Adverse Decision in Interference

In Interference No. 100,314, involving Patent No. 4,098,744, R. A. Allen and L. W. Scott, CURABLE WATER-BORNE EPOXY RESIN COATING COMPOSITIONS, final judgment adverse to the patentees was rendered Feb. 27, 1981, as to claims 1-12.

[*Official Gazette June 2, 1981.*]